United States Patent [19]

Chase et al.

[11] 4,130,481
[45] Dec. 19, 1978

[54] MAINTAINING OPTIMUM SETTLING RATE OF ACTIVATED SLUDGE

[75] Inventors: Lee M. Chase, Los Gatos; Julius J. Muray, Los Altos, both of Calif.

[73] Assignee: FMC Corporation, San Jose, Calif.

[21] Appl. No.: 833,923

[22] Filed: Sep. 16, 1977

Related U.S. Application Data

[63] Continuation-in-part of Ser. No. 768,255, Feb. 14, 1977, abandoned.

[51] Int. Cl.² ............................. C02C 1/06; C02C 5/10
[52] U.S. Cl. ........................................... 210/6; 210/11; 210/73 S; 210/96 R; 195/103.5 R; 195/117
[58] Field of Search ............... 195/31 R, 32, 33, 103.5, 195/108, 109, 113, 117; 210/3, 4, 6, 7, 9, 11, 15, 73 S, 86, 96 R, 103, 104

[56] References Cited

U.S. PATENT DOCUMENTS

| 2,946,443 | 7/1960 | Schmidt | 210/96 R |
| 3,342,727 | 9/1967 | Bringle | 210/15 |
| 3,547,811 | 12/1970 | McWhirter | 210/104 |
| 3,558,255 | 1/1971 | Rose | 210/96 |
| 3,596,767 | 8/1971 | Antonie | 210/6 |
| 3,684,702 | 8/1972 | Hartman | 195/103.5 R |
| 3,727,450 | 4/1973 | Luckers | 73/23 |
| 3,731,522 | 5/1973 | Mikesell | 210/96 R |
| 3,861,195 | 1/1975 | Vom Hagen | 73/23 |
| 3,920,550 | 11/1975 | Farrell | 210/104 |
| 3,959,124 | 5/1976 | Tchobanoglous | 210/73 S |
| 3,986,932 | 10/1976 | Brushwyler | 195/103.5 R |

FOREIGN PATENT DOCUMENTS

| 2,121,715 | 11/1971 | France | 210/96 R |
| 440,142 | 8/1972 | U.S.S.R. | 210/96 R |

*Primary Examiner*—Charles N. Hart
*Assistant Examiner*—Ernest G. Therkorn
*Attorney, Agent, or Firm*—C. E. Tripp; J. F. Verhoeven

[57] ABSTRACT

A completely mixed system for controlling the return rate of activated sludge to the aeration tank in activated sludge sewage treatment system plants is disclosed wherein the return rate of activated sludge is controlled to maintain the density of the activated sludge in the aeration tank at an optimum value, which value will result in the optimum settling rate of the activated sludge in the secondary clarifier. The control system is continuous and requires the use of a computer, which continuously receives various measured quantities necessary to compute the control signal for the returned activated sludge pump. The carbon dioxide respired by the cells in the aeration tank is collected along with the aeration air and a non-dispersive infrared ray analyzer determines the percent of carbon dioxide in the collected gases. This determination is one of the factors entering into the computation of the rate of substrate consumption by the activated sludge. Other measured quantities entering the computer are the rate of air flow entering the diffuser, the density of the activated sludge in the aeration tank, the rate of flow of effluent from the aeration tank and the density of returned activated sludge collected in an activated sludge storage tank. Various physical and biological constants are manually set into the computer, the principal output of which is a signal for controlling the rate of return of activated sludge in the sludge storage tank to the aeration tank. The density of the stored activated sludge is also determined and enters the computer. The computer also compares this density with the actual measured density of the activated sludge in the aeration tank and if the stored sludge density does not exceed the measured density, a warning is given indicating that it is futile to return the stored activated sludge to the aeration tank.

6 Claims, 6 Drawing Figures

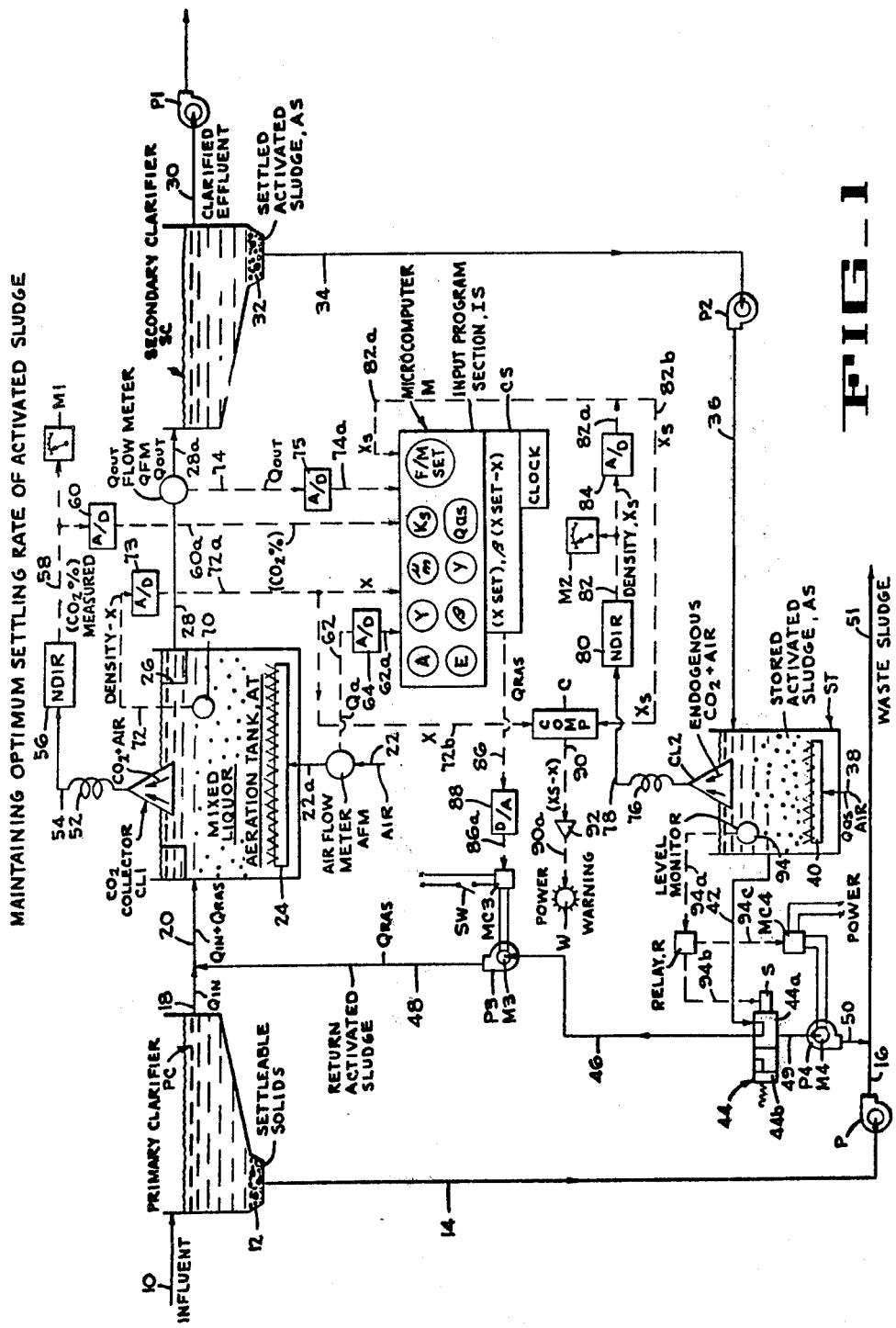

PART ONE — COMPUTING OPTIMUM ACTIVATED SLUDGE DENSITY (XSET) FOR OPTIMUM SETTLING RATE (F/M)SET.

$\left(\dfrac{dS}{dt}\right)_u =$ UNIT RATE OF SUBSTRATE CONSUMPTION BY CELLS IN AERATION TANK. (1)

$$F = S_{IN} Q_{IN} \quad (2)$$

IN ORDER TO MAINTAIN A MASS BALANCE:

$$V \left(\dfrac{dS}{dt}\right)_u = F - S_{OUT} Q_{OUT} \quad (3)$$

REARRANGING (3) TO FIND F, IN EQUILIBRIUM.

$$F = V \left(\dfrac{dS}{dt}\right)_u + S_{OUT} Q_{OUT} \quad (4)$$

$$\dfrac{F}{M} = \dfrac{F}{XV} \quad \text{NOTE - F COMING IN INDEPENDENT OF CELL MASS IN THE TANK, M.} \quad (5)$$

SOLVING (5) FOR X AND ASSIGNING OPTIMUM VALUES;

$$X_{SET} = \dfrac{F}{\left(\dfrac{F}{M}\right)_{SET} V} \quad \text{(THE ULTIMATE VALUE FOR PART ONE.)} \quad (6)$$

COMPUTING X SET $$\left(\dfrac{dX}{dt}\right)_{GROWTH} = \mu X \quad \text{(CELL GROWTH RATE IN TERMS OF CELLS PRESENT.)} \quad (7)$$

$$\left(\dfrac{dX}{dt}\right)_{GROWTH} = Y \left(\dfrac{dS}{dt}\right)_u \quad \text{(CELL GROWTH RATE IN TERMS OF SUBSTRATE CONSUMPTION.)} \quad (8)$$

EQUATING (7 AND 8) AND SOLVING FOR $\left(\dfrac{dS}{dt}\right)_u$ $$\left(\dfrac{dS}{dt}\right)_u = \dfrac{\mu X}{Y} \quad \text{(SUBSTRATE CONSUMPTION RATE BASED ON CELL GROWTH.)} \quad (9)$$

MONOD MODEL FOR DETERMINING CELL GROWTH RATE IN TERMS OF SUBSTRATE CONCENTRATION.

$$\mu = \mu_m \dfrac{S}{K_S + S} \quad \text{(IN A COMPLETELY MIXED SYSTEM, } S_{OUT} = S \text{ IN THE TANK.)} \quad (10)$$

SUBSTITUTING (10) FOR $\mu$ IN (9):

$$\left(\dfrac{dS}{dt}\right)_u = \dfrac{\mu_m}{Y} \dfrac{X\, S_{OUT}}{K_S + S_{OUT}} \quad (11)$$

FIG_2

FIG_2A

PART ONE, CONT'D.

REARRANGING (11) TO OBTAIN $S_{OUT}$:

$$S_{OUT} = \frac{K_S \left[\frac{Y}{X\mu_m}\left(\frac{dS}{dt}\right)_u\right]}{1 + K_S \left[\frac{Y}{X\mu_m}\left(\frac{dS}{dt}\right)_u\right]} \quad (12)$$

SUBSTITUTING (12) FOR $S_{OUT}$ IN (4):

$$F = \frac{K_S \left[\frac{Y}{X\mu_m}\left(\frac{dS}{dt}\right)_u\right]}{1 + K_S \left[\frac{Y}{X\mu_m}\left(\frac{dS}{dt}\right)_u\right]} Q_{OUT} + V\left(\frac{dS}{dt}\right)_u \quad (13)$$

REARRANGING (13):

$$F = \left(\frac{dS}{dt}\right)_u \left\{ V + \frac{K_S Q_{OUT}}{\frac{X\mu_m}{Y} - \left(\frac{dS}{dt}\right)_u} \right\} \quad (14)$$

$$\left(\frac{dS}{dt}\right)_u = A\left(\frac{d(CO_2)}{dt} - EX\right) \quad \text{(SUBSTRATE CONSUMPTION RATE BASED ON CELL RESPIRATION).} \quad (15)$$

$$\frac{d(CO_2)}{dt} = (CO_2\%)Q_a' \quad \text{($CO_2$ PRODUCTION RATE COMPUTED FROM MEASUREMENTS).} \quad (16)$$

SUBSTITUTING (16) INTO (15), SUBSTITUTING RESULT FOR $\left(\frac{dS}{dt}\right)_u$ IN (14) AND REARRANGING:

$$F = A\left[(CO_2\%)Q_a' - EX\right]\left\{ V + \frac{K_S Q_{OUT}}{\frac{X\mu_m}{Y} - A\left[(CO_2\%)Q_a' - EX\right]} \right\} \quad (17)$$

SUBSTITUTING (17) IN (16) TO OBTAIN $X_{SET}$:

$$X_{SET} = \frac{A}{\left(\frac{F}{M}\right)_{SET} V} \left[(CO_2\%)Q_a' - EX\right]\left\{ V + \frac{K_S Q_{OUT}}{\frac{X\mu_m}{Y} - A\left[(CO_2\%)Q_a' - EX\right]} \right\} \quad (17a)$$

PART TWO — COMPUTING IDEAL RATE OF FLOW
(Q$_{RAS}$) OF RETURN ACTIVATED SLUDGE.

$$\frac{dX}{dt} = \overbrace{X_S \, Q_{RAS} \frac{1}{V}}^{\substack{\text{RETURN RATE} \\ \text{OF ACTIVATED} \\ \text{SLUDGE}}} - \overbrace{X \, Q_{OUT} \frac{1}{V}}^{\substack{\text{OVERFLOW} \\ \text{LOSS RATE}}} + \overbrace{Y \frac{dS}{dt}}^{\substack{\text{CELL} \\ \text{GROWTH} \\ \text{RATE}}} \tag{18}$$

$$\left(\frac{dS}{dt}\right)_u = A\left(\frac{d(CO_2)}{dt} - EX\right)(15) = A(\Delta) \text{ (SHORTHAND FOR (15))}. \tag{19}$$

SUBSTITUTING (19) FOR $\left(\frac{dS}{dt}\right)_u$ IN (18) AND REARRANGING.

$$\frac{dX}{dt} = \frac{1}{V}\left[Q_{RAS} X_S - X Q_{OUT}\right] + YA(\Delta) \tag{20}$$

WANT THE RATE OF CHANGE OF ACTIVATED SLUDGE DENSITY TO BE FUNCTION OF DENSITY DIFFERENCE (ERROR).

$$\frac{dX}{dt} = \beta \, (X_{SET} - X) \tag{21}$$

EQUATING (20) AND (22):

$$\beta \, (X_{SET} - X) = \frac{1}{V}\left[Q_{RAS} X_S - X Q_{OUT}\right] + YA(\Delta) \tag{22}$$

FIG_3

FIG_3A

SOLVING (22) FOR $Q_{RAS}$:

$$Q_{RAS} = \frac{V\beta(X_{SET}-X) - VYA(\Delta) + X Q_{OUT}}{X_s} \quad (23)$$

REARRANGING (23):

$$Q_{RAS} = \underbrace{\frac{V\beta}{X_s}(X_{SET}-X)}_{\substack{\text{CORRECTS}\\\text{DIFFERENCE}\\\text{IN DENSITIES.}}} + \overbrace{\underbrace{\frac{X Q_{OUT}}{X_s}}_{\substack{\text{LOSS TO}\\\text{CLARIFIER.}}} - \underbrace{\frac{V YA(\Delta)}{X_s}}_{\text{GROWTH}}}^{\text{STEADY STATE SLUDGE RETURN RATE}} \quad (24)$$

$$Q_{IN} = Q_{OUT} - Q_{RAS} \quad \text{(SEE FIG. 1)} \quad (25)$$

RESTATING (24) IN TERMS OF $Q_{IN}$:

$$Q_{RAS} = \underbrace{\frac{V\beta}{X_s-X}(X_{SET}-X)}_{\substack{\text{CORRECTS}\\\text{DIFFERENCE}\\\text{IN DENSITIES.}}} + \overbrace{\underbrace{\frac{X Q_{IN}}{X_s-X}}_{\substack{\text{LOSS TO}\\\text{CLARIFIER}}} - \underbrace{\frac{V YA(\Delta)}{X_s-X}}_{\text{GROWTH}}}^{\text{STEADY STATE SLUDGE RETURN RATE}} \quad (26)$$

FIG 4

Part Three — Simplified Computation of X set.

$$\left(\frac{dS}{dt}\right)_u = A\left(\frac{d(CO_2)}{dt} - EX\right) \tag{15}$$

$$\left(\frac{dS}{dt}\right)_u = A\,\frac{d(CO_2)}{dt} \quad \text{(SUBSTRATE CONSUMPTION RATE IN TERMS OF CELL RESPIRATION OMITTING ENDOGENOUS RESPIRATION).} \tag{28}$$

$$\left(\frac{dS}{dt}\right)_u = \frac{1}{V}(S_{IN}\,Q_{IN} - S_{OUT}\,Q_{OUT}) \quad \text{(SUBSTRATE CONSUMPTION RATE IN TERMS OF FLOW).} \tag{29}$$

IF $S_{OUT}$ IS SMALL:

$$\left(\frac{dS}{dt}\right)_u = \frac{1}{V}\,S_{IN}\,Q_{IN} \tag{30}$$

EQUATING (28) WITH (30) AND SOLVING FOR $S_{IN}\,F_{IN}$:

$$S_{IN}\,Q_{IN} = VA\,\frac{d(CO_2)}{dt} \tag{31}$$

$$\frac{d(CO_2)}{dt} = (CO_2\%)\,Q\alpha' \tag{16}$$

SUBSTITUTING (16) INTO (31) IN TERMS OF F:

$$F = S_{IN}\,Q_{IN} = VA\,Q\alpha'\,(CO_2\%) \tag{32}$$

SUBSTITUTING (32) FOR F IN (16) TO FIND $X_{SET}$:

$$X_{SET} = \frac{AQ\alpha'}{\left(\frac{F}{M}\right)_{SET}}(CO_2\%) \tag{33}$$

MAINTAINING OPTIMUM SETTLING RATE OF ACTIVATED SLUDGE

REFERENCE TO RELATED APPLICATIONS

This application is a continuation in part of our copending U.S. application Ser. No. 768,255, filed Feb. 14, 1977 and assigned to the FMC Corporation, now abandoned.

DESCRIPTION OF PRIOR ART

The use of non-dispersive infra-red analyzers for measuring the composition of gases is a known technique as evidenced by the U.S. Pat. No. 3,727,450, to Luckers, Apr. 7, 1973. This patent is directed to improvements in the Calibration of such an analyzer.

The U.S. Pat. No. 3,557,954, to Weich Jan. 26, 1971, discloses an activated sludge treatment system employing a mechanical aerator for the aeration tank and a mechanically aerated storage tank for activated sludge withdrawn from the secondary clarifier or settling tank. As seen in FIG. 1, the system of this patent employs a commercially available dissolved oxygen probe to measure the dissolved oxygen content of the mixed liquor in the aeration tank, which in turn represents a measure of the ability of the cells in the activated sludge to maintain the desired growth rate. Oxygen probe measurement signals are employed to control the speed of the motor which drives the aerating disc in the aeration tank, the speed being increased if dissolved oxygen readings are low. This patent also discloses the use of a dissolved oxygen probe in the reactivation unit or storage tank for activated sludge withdrawn from the settling tank or secondary clarifier. The sludge in this tank is also aerated by a mechanical aerator, the motor of which is controlled by a dissolved oxygen probe in the storage tank in accordance with the principles just described in connection with the aeration tank of that system.

The U.S. Pat. No. 3,558,225, to Rose issued Jan. 26, 1971, measures the suspended solids density in the aeration tank 14 with a light source — photocell probe 25,26, to control the blower 42 for the aeration tank 14 as well as for controlling an activated sludge return motor 20. Probes of this type provide variable characteristics due to fogging by accumulations of opaque films. etc.

The U.S. Pat. No. 3,596,767, to Antonie' issued Aug. 3, 1971, controls the return of activated sludge to a contactor type treatment tank 14 from a clarifier 24 by pump 24. The control is based on control signals derived from a flow meter 40 in the influent line 12 to the contactor and a TCD, TOD or COD analyzer that samples the material in the inlet conduit 12 between the primary treatment tank 10 and the biological treatment tank 14.

The U.S. Pat. No. 3,684,702, to Hartmann issued Aug. 15, 1972, controls the activated sludge return valve 6 by a signal derived from seven fermenter units in an aerated analysis fermenter 10 supplied with a sewage sample, a sludge sample and distilled water from a dosing device 7. The analysis fermenting measure, their individual BOD's which are recorded and sent to a computer 12 for controlling the aforesaid sludge return valve 6.

The U.S. Pat. No. 3,986,932, to Brushwyler et al issued Oct. 19, 1976, discloses in FIG. 2 a variable input sewage system wherein the return rate of activated sludge is automatically controlled. The system relies upon a commercial bacterial respirometer 36 and a flow meter in the return sludge line 18 and a similar respirometer 37 in the line 20 to the aeration tank which operates in conjunction with the flow meter 48 in the effluent line from the secondary clarifier. The two respirometer and flow meter combinations produce a BOD signal which equals the product of the flow rate and the respiration rate. The unit 56 gives the ratio of the BOD of the influent to the BOD of the return activated sludge and this ratio is applied when a line 62 to a comparator module 64 which has a set point at a preselected value of the aforesaid ratio. The comparator unit 64 generates a control signal in line 66 that operates the sludge return control valve 40. The respirometers 36,37 as described are commercial units which employ electrolytic sensing probes at two positions in a resident tube that receives aerated sludge or sewage from an aeration vessel and measures the oxygen depletion in the residence tube. No control of the return rate of activated sludge by monitoring $CO_2$ respiration of the cells in the aeration tank is disclosed.

Other patents of which applicants are aware but which are deemed to be less pertinent than those commented upon are as follows:

Schmidt U.S. Pat. Nos. 2,964,443—July 26, 1960
Bringle 3,342,727—Sept. 19, 1967
McWhirter 3,547,811—Dec. 15, 1970
Mikesell 3,731,522—May 8, 1973
von Hagen 3,861,195—Jan. 21, 1975
Farrell et al 3,920,550—Nov. 18, 1975
Tschobanoglous 3,959,124—May 25, 1976
French Pat. No. 2,121,715—Aug. 8, 1972
(Sherritt, Gordon Mines Ltd. of Canada)

The fact that the rate and the extend of oxidation of organic material (skim milk) by microorganisms when employed to oxidize waste in a solution can be correlated with measurement of the carbon dioxide evolved from a vigorously aerated sample of the solution by passing the spent air through barium hydroxide is disclosed in "Biological Treatment of Sewage and Industrial Wastes", Volume 1, McCabe and Eckenfelder, Jr., published by the Reinhold Publishing Corporation of New York City, Page 40, (1965).

General Description of the Activated Sludge Process

The activated sludge process for treating sewage to provide a clarified effluent is a biological contact process wherein living micro-organisms and incoming sewage are brought together and agitated in an aeration tank. The sewage contains some suspended and colloidal organic solids which form nuclei on which biological life develop and build up or metabolize to a floc or larger solids, known as activated sludge. The suspension of activated sludge in the areation tank liquid is termed mixed liquor. The mixed liquor is aerated so that it contains sufficient dissolved oxygen to enable the living microorganisms (cells) in the sludge to metabolize, under aerobic conditions, collodial and dissolved organic matter in the sewage by using such matter as food. As some of the bacteria (cells) attack the original complex organic substances they produce simpler waste products, other bacteria thrive on the waste products, etc., until the final waste products can no longer be used as food (often referred to as substrate) for the bacteria. During this process, the bacteria multiply and form the floc previously referred to as activated sludge. In the system to be described by way of example, the dissolved oxygen necessary for the biological process is provided by a diffuser that delivers a continuous flow of air to the mixed liquor, the quantity of air being sufficient for the metabolism of the bacteria. The reduction in air flow volume due to oxygen absorption by the mixed liquor is insignificant, substantially all of the air diffused into the mixed liquor is employed to keep solids, such as the activated sludge in the aeration tank in suspension, and the air facilitates mixing and contact of the sludge with the sewage to be treated in the mixed liquor.

In a typical continuous treatment process, incoming sewage enters a primary clarifier or sedimentation tank which collects settleable solids in a hopper by sedimentation for separate removal. The sewage leaving the primary clarifier and returned activated sludge are fed to the aeration tank. Mixed liquor is withdrawn from the aeration tank at the same rate that sewage and returned activated sludge are supplied thereto. The mixed liquor effluent from the aeration tank is delivered to a secondary clarifier wherein the suspended activated sludge is allowed to settle out for separate removal, leaving clarified water in the tank. The clarified effluent normally overflows out of the secondary clarifier and perferably the clarified effluent contains no more than 30 ppm by weight of organic material. If required, the clarified effluent may be delivered to its destination by a pump.

At start up, sewage entering the aeration tank does not contain enough bacteria to provide for a sufficiently rapid removal under aerobic conditions of organic material from the sewage. Therefore, until steady state operation is attained, the accumulation of activated sludge in the mixed liquor withdrawn from the aeration tank, which settles out at the secondary clarifier, is returned to the inlet of the aeration tank as returned activated sludge, to build up a mass of sludge in the aeration tank adequate for rapid and effective treatment of the sewage therein.

After steady state operation of a treatment plant has been attained, and under normal influent conditions to the aeration tank, the increase in the mass of activated sludge that takes place in a given period of time almost equals the rate at which activated sludge is withdrawn from the aeration tank as a component of the mixed liquor therein. Accordingly, means are provided for returning only part (eg about 30% to 40% of the volume of the influent flow) of the activated sludge settled out in the secondary clarifier to the aeration tank for maintaining an optimumly effective mass of cells in the tank. The remainder of the settled activated sludge from the secondary clarifier is wasted to an anaerobic digester or the like for final treatment and ultimate disposal.

Basic Terms

To avoid confusion, several basic terms will be employed as this description proceeds, as well as in the appended claims will be defined at this point. The term "food", when associated with the symbol (F) is a rate, and will refer to the weight of organic material in the sewage entering the aeration tank during a given period of time, (such as 1 hour). A small percentage of the food (F) entering the aeration tank during a given period of time is not consumed by the activated sludge in the tank, and hence is included in the mixed liquor effluent withdrawn from the tank during that time. No single term is applied to this item.

The term "substrate" (S) will refer to the organic material in the mixed liquor in the aeration tank which is being consumed as food by the bacteria in the activated sludge. The term "mass" (M), when unqualified, will refer to the total dry weight of the activated sludge in the aeration tank. The terms "activated sludge", "microorganisms", "bacteria" and "cells" are used interchangeably, and refer to the biological mass which consume organic sewage material under aerobic conditions.

SUMMARY OF THE INVENTION

The present invention relates to the control of activated sludge sewage treatment systems of the type previously described. The embodiment to be described in detail is of the type wherein the mixed liquor in the aeration tank is a uniform suspension of solids (principally activated sludge) substantially throughout its volume. Although the detailed description that follows described a control system wherein the mixed liquor in the aeration tank is substantially completely mixed, basic aspects of the system such as providing a control signal for the return of activated sludge which includes a factor relating to the measurement of respiratory carbon dioxide from the cells can be utilized in a "Plug flow" system.

As background for an appreciation of the problem solved by the system of the present invention, reference is made to the "Manual Instruction For Sewage Treatment Plant Operators", prepared by the New York State Department of Health and distributed by the Health Educational Service of Albany, New York. On page 62, under the heading "Return of the Proper Amount of Activated Sludge for Mixture With the Sewage", the following statement is found:

"The best concentration (of solids and mixed liquor) must be determined for each plant by trial operation and should be carefully maintained by controlling the proportion of returned sludge. The maximum concentration is limited by the air supply and sewage load. If solids are allowed to build up, the air and food requirements will exceed those available and an upset will occur."

Also, on Page 99 of the aforesaid McCabe et al publication the following statement is made:

"Operation

"The proper operation of normal activated sludge systems or any of their modifications depends on close operational control of the system. One of the problems facing activated sludge systems has been their failure to absorb shock organic loads. Shock organic loads upset the food-micro-organisms ratio normally maintained in a given system. Failure to extend the aeration period sufficiently results in raising the final energy level above normal, giving poor flocculation and poor stabilization. Control of shock loads can be made only by rapid detection of the shock and proper design of the system to handle it. At the present time this is not possible."

The system of the present invention not only provides control for shock loads but for all load changes, increasing or decreasing. No reliance is placed upon "extending the aeration time." In the present system the proportion of returned sludge is automatically controlled to optimize the setting rate of the activated sludge in the secondary clarifier, which in turn minimizes the amount of activated sludge in the clarified effluent that is withdrawn from the secondary clarifier. It is desired to keep the amount of organic material in the clarified effluent at a very small value, such as about 30 ppm. However, if the activated sludge is not adequately settled out at the secondary clarifier, some of it will be withdrawn with the clarified effluent along with the unconsumed food, so that the effluent contains an unacceptably high amount of organic matter.

As previously mentioned, as the activated sludge builds up in the aeration tank, it produces a floc which can be considered to be a mass of individual agglomerations of cells and organic matter. If the agglomerations are too small, they will remain in suspension in the final clarifier for an unacceptably long period of time, because their settling rate will be too slow to keep the withdrawn clarified effluent adequately free of organic matter.

The Sludge Volume Index (SVI) is a measure of the effectiveness for settling out solids from a particular suspension. SVI has the dimensions of $cm^3$/gram and is determined by observing the volume occupied by a given weight of solids after 30 minutes settling time in a standard procedure. A low SVI indicates good solids removal will be obtained in a clarifier (few solids in the final effluent).

Numerous studies (see the aforesaid McCabe and Eckenfelder, "Biological Treatment of Sewage and Industrial Wates", Reinhold Publishing Co., New York (1965), Pages 271-276) have shown that the SVI index is a function of the weight of biochemical oxygen demand loading (BOD) during a given time divided by the weight of activated sludge (cells) suspended in the aeration tank. In this specification, the aforesaid ratio will be referred to as the F/M ratio. It has been observed that both high and low F/M ratios yield high SVI index values. Thus poor activated sludge settling characteristics can be caused by underloading as well as by overloading the aeration tank on terms of food (F) supplied per unit time divided by the unit mass (M) of active microorganisms in the tank. The optimum F/M ratio is about 0.3/day. It is critically important, then, that the (F/M) ratio be maintained near the optimum value of about 0.3/day or about 0.0125/hr.

The system of the present invention includes measuring and control operations whereby the agglomerates of activated sludge are maintained at approximately their optimum density for rapid settling; i.e., the F/M ratio is maintained at an optimum value, to be called $(F/M)_{SET}$.

It is known that in an activated sludge treatment system, the activated sludge agglomerates in the mixed liquor will have physical characteristics that provide optimum settling rate at the secondary clarifier at the aforesaid optimum ratio of food to mass (F/M ratio). As previously explained, the term "food" (F) refers to the weight of food entering the aeration tank in a given period of time. Heretofore, obtaining the measurement of the rate of food entry to the aeration tank, as an element of treatment control, has been a tedious and time consuming laboratory process. For instance, the amount of food in the influent can be measured by a biochemical oxygen demand (BOD) test, a test which is well known in the art and which involes an initial measurement of the oxygen content of a sample, and a subsequent measurement 5 days later to produce what is known as the five day biochemical oxygen demand ($BOD_5$). This measurement is then used as an indication of the "strength" or concentration of food in sewage that was tested.

An alternative procedure is to determine the total organic carbon (TOC) in the raw sewage, as a measure of the food loading of the aeration tank. Again, this is a time consuming laboratory process, requiring oxidation of the carbon to $CO_2$, a non-dispersive infrared analyzer and the establishment of an empirical relation between the total organic carbon, the biochemical oxygen demand and the chemical oxygen demand.

Another approach to determining the strength of food concentration in the incoming sewage is by measuring the oxygen utilized in the aeration tank. If the depletion of the oxygen in the air entering the tank (such as from the diffuser) is known, the amount of oxygen taken up by the active organisms in the mixed liquor can be considered to have a relation to the food concentration in the influent sewage, as described in pages 49,50 of the aforesaid McCabe et al reference. This reference also states that the quantity of oxygen which will be consumed by activated sludge "may be" evaluated by manometric measurements of the endogenous and substrate respiration in contact with sludge. As will be seen, the system of the present invention does involve measurements of cell respiration (in a manner not suggested in the reference), but these measurements are employed as factors in the continuous computation of an activated sludge return signal ($Q_{RAS}$) in a manner not suggested by the references.

Oxygen uptake can be measured by means of commercially available probes, but these devices tend to become encrusted with a film of material which reduces their accuracy. In a system wherein the activated slude is homogeneously dispersed throughout the aeration tank, namely in a completely mixed system, the mixed liquor will have an oxygen content as law as 1 ppm. Use of such a sensitive measurement and equipment, the accuracy of which varies with time, is not a satisfactory technique for obtaining continuously current data in order to measure the amount of food entering the aeration tank. The use of paired respirometers employing electrolytic probes for controlling sludge return is disclosed in the aforesaid Brushwyler et al patent.

Another known procedure for measuring the dissolved oxygen content of the mixed liquor is a chemical method called a Winkler titration. This is a laboratory procedure which does not lend itself to the provision of current data for continuous control of the system on a current basis.

In the broader aspects of the present invention, it has been found that the rate (F) of food entry into the aeration tank, the measurement of which is necessary to optimize activated sludge settling, can be obtained by continuously measuring the metabolic rate of the mass (M) of activated sludge in the aeration tank and the density (X) of the mass. An essential determination which must be entered into the control system of the present invention for optimizing the settling rate of the activated sludge in the primary clarifier is that of selecting the food to mass ratio $(F/M)_{SET}$ which provides the aforesaid optimum activated sludge settling rate. This is a constant that is determined by known laboratory procedures, such as finding the (SVI) as previously described, and once determined can be considered to remain substantially unchanged. Other steps include continuously determining the rate of substrate consumption in the aeration tank (food being consumed by the bacteria), based on said metabolic rate measurement and using this determination to find the rate F of entering food, continuously determining an optimum or set density ($X_{SET}$) of the mass of activated sludge in the tank based upon the aforesaid determination of the food rate (F), the rate of substrate consumption in the tank and the selected food to mass ratio (F/M) (a constant such as 0.3/day) continuously comparing the measured activated sludge density (X) with the optimum or set activated sludge density ($X_{SET}$) and using the resultant density difference for altering the portion of activated sludge returned to the aeration tank until the density difference is zero.

A critical determination essential to the system is that of continuously determining the optimum or set density ($X_{SET}$) of the mass of activated sludge in the aeration tank, based upon the determination of the rate of substrate consumption in the tank by the activated sludge and the selected food to mass ratio F/M. In making this set density determination, the steps to be performed to solve equations (to be described) are programmed into the computer by a computer programmer in the usual manner. The programmer also sets in certain biological constants relating to the behavior of bacteria during substrate consumption, and certain physical constants, such as the volume of the aeration tank are programmed into the computing device, such as a conventional microcomputer. The computer is also wired or interfaced to continuously receive variable measurements, such as the metabolic rate of the activated sludge in the tank, its measured density (X), the rate of air flow into the tank (Qa) and in the most precise embodiment of the system, the rate of flow ($Q_{OUT}$) of mixed liquor from the aeration tank.

In the preferred embodiment, activated sludge is returned to the aeration tank by a motor driven pump, the variable speed motor of which is controlled by a controller. The measured density (X) of the activated sludge in the mixed liquor, in addition to being utilized for calculations by the microcomputer, is also directed to a comparator unit which would most likely be part of the computer. The computed optimum or set density of the sludge ($X_{SET}$), previously referred to, is calculated by the computer and also enters the comparator. The difference ($X_{SET}$-X) between the optimum or set density and the measured density formed by the comparator is multiplied by a selected constant and utilized to operate the motor controller for the pump that returns the activated sludge. If the aforesaid difference is large, the pump will run at a relatively high speed, because this indicates a deficiency of activated sludge in the aeration tank. As the difference decreases, the pump is slowed down because the measured density is approaching the set density. If the measured activated sludge density equals the computed set density, the comparator difference is zero and the sludge return pump is operated at a speed which is just sufficient to replenish the activated sludge withdrawn from the aeration tank.

As previously stated, in the broader aspect of the invention, the metabolic rate of the mass of activated sludge in the aeration tank is continuously measured and utilized as one of the variable inputs to the microcomputer. In the preferred embodiment of the invention, it has been found that the aforesaid metabolic rate of the activated sludge can be measured in a simple manner which produces metabolic rate information that is adequately concurrent with actual system conditions for use as employment in the aforesaid determination of the optimum or set activated sludge density ($X_{SET}$). This measurement is made by continuously collecting the gases leaving a predetermined area of the surface of the mixed liquor in the aeration tank (primarily air and $CO_2$) and continuously measuring the percentage of $CO_2$ in the collected gases. The volume of $CO_2$ provided during a given period of time is then continuously determined (based on the known rate (Qa) of air flow into the tank) and is employed as an index of the metabolic rate of the mass of activated sludge in the tank. The amount of substrate in the tank is continuously determined, based on the aforesaid determination of the rate of $CO_2$ production. The remaining steps in the process are like those previously described.

More specifically, the gases referred to, which are principally $CO_2$ and air introduced into the mixed liquor, are collected by a simple inverted cone and directed to an analyzer, such as a non-dispersive infrared analyzer. The output signals of the analyzer are in terms of the percentage of $CO_2$ in the gases collected from the aeration tank, and knowing the rate (Qa) of air flow introduced to the tank, the rate of $CO_2$ production is determined. It has been found that this determination has a close enough positive correlation to the metabolic rate of the activated sludge in the aeratin tank so that any time lag between the $CO_2$ production measurement and the biological activity being measured is short enough so that the $CO_2$ measurement can be used as one of the variable elements in the calculations performed by a computer in the system.

One of the problems with which operators of an activated sludge sewage system are presented are conditions which arise when the rate of food entering the aeration tank from the primary clarifier varies, particularly when it varies suddenly. As mentioned, a particularly troublesome variation is one wherein the rate of food introduction increases rapidly, providing a "shock load". This increases the rate at which the mass of activated sludge cells in the tank must consume the incoming food and if uncorrected, the effluent from the secondary settler would contain an excess of unconsumed food.

In the control system of the present invention, the aforesaid increased loading conditions would result in an increase in the computed optimum sludge density ($X_{SET}$), the difference between that and the measured density (X) would increase and the amount of activated sludge returned to the aeration tank by the pump would be increased, to bring the measured cell density in the tank up to its optimum value.

If the amount of food entering the aeration tank from the primary clarifier decreases, the problem is not as severe and is handled in a different manner. In the normal operation of an activated sludge sewage treatment system, a certain percentage of the settled activated sludge from the secondary clarifier is continuously returned to the aeration tank, this percentage being in the order of 30-40% of the volume of the influent sewage. Thus, if the amount of food entering the aeration tank decreases, the mass (M) of cells in the tank required to consume the food at the rate at which the food is entering also decreases. The food to mass ratio (F/M) in the tank will now become smaller than the optimum value and the density of the agglomerates of cells in the tank will progressively decrease. This reduces the settling rate in the secondary clarifier and hence causes a significant increase in the amount of activated sludge drawn off with the clarifier effluent.

The aforesaid decrease in the rate of entering food (F) results in a corresponding decrease in the metabolic rate of the mass of cells in the tank, which is the preferred embodiment of the invention, results in a decreased rate of $CO_2$ production. The microcomputer senses the decreased metabolic rate of the cells and interprets it as a decrease in the rate of entering food (F). The mass (M) of the cells in the tank is measured as before and a new optimum cell density ($X_{SET}$) is determined which will restore (F/M) ratio to its preset optimum value. Under extreme conditions, the measured cell density (X) might be so high that the comparison ($X_{SET}$-X) becomes negative, and under these abnormal conditions, the controller could stop the motor that drives the activated sludge return pump until the withdrawal of activated sludge from the tank has reduced the measured density (X) to the optimum value ($X_{SET}$).

In order to insure that the activated sludge return pump has an adequate source of living cells or activated sludge for return to the aeration tank, an aerated activated sludge storage tank is interposed between the sump of the secondary clarifier (from which settled activated sludge is pumped) and the activated sludge return pump. The activated sludge in the aforesaid storage tank is continuously aerated by diffusing air through the tank, as in the case of the aeration tank, and thus the bacteria in that tank are kept alive and aerobic (active only in the presence of oxygen) for return to the aeration tank as required. It would be of no avail to return activated sludge to the aeration tank which is less dense than the activated sludge already in the tank, because such return would merely dilute the activated sludge in the tank and hence would not compensate for the steady withdrawal of sludge with the mixed liquor. Accordingly, the density ($X_s$) of the stored aerated sludge is measured and displayed and means are provided so that the stored sludge density can be compared with the measured sludge density (X) in the aeration tank. If the stored sludge density is less than that in the tank (an abnormal condition) a signal is provided to the effect that the return of sludge from the storage tank to the aeration tank can theoretically be interrupted. In practice, it is probably preferable to permit a small flow of return sludge under these abnormal conditions to prevent stagnation of the sludge in the return line.

In this regard, and under the preferred embodiment of the invention, the density ($X_s$) of the stored sludge need not be measured directly with a sludge density meter which must be immersed in the tank, but can be measured by a nonclogging gas collector and an external NDIR analyzer, such as those employed at the aeration tank. Since the storage tank contains only aerated, living activated sludge and no food, the metabolic rate is merely that of endogenous respiration by the cells and the $CO_2$ included in the collected gases represents the endogenous $CO_2$ production by the cells. The ($CO_2$%) measured by the NDIR analyzer is thus proportioned to sludge density and the analyzer signals are so employed.

BRIEF DESCRIPTION OF THE DRAWINGS

FIG. 1 is a schematic flow diagram of a sewage treatment plant embodying the invention.

FIGS. 2 and 2A show a sequence of equations explaining principles of the present invention. These equations relate to the method of determining the optimum activated sludge density, $X_{SET}$.

FIGS. 3 and 3A are a set of equations showing the development of a set of equations for computing the ideal rate of flow of returned activated sludge, $Q_{RAS}$.

FIG. 4 is a set of equations for determining $X_{SET}$ employing some simplifying but practical assumptions.

DETAILED DESCRIPTION

The detailed description of a preferred embodiment of the invention that follows will describe a continuously mixed system, although the basic principles of the invention can be employed in a plug flow system. The detailed description will first include a description of the flow diagram of FIG. 1, including actual flow quantities as well as the signal quantities required for control of the system. The description will then follow with an explanation of equations of FIGS. 2 and 2A (Part One), which explain the principles of arriving at the equation for the optimum activated sludge density ($X_{SET}$) for the optimum settling rate.

The description will then refer to FIG. 3, (Part Two) of the determination, namely, that of computing the ideal rate ($Q_{RAS}$) of flow of return activated sludge. FIG. 4, (Part Three) comprises a simplified set of equations for computing ($Q_{RAS}$).

Since the control system of the present invention is intended to control the return of activated sludge by continuous operational basis, and since the computations which must be performed are somewhat complex, the system is designed to take advantage of conventional computing units such as a computer known in the art as a microprocessor or microcomputer. Computers of this type are commercially available and although they basically operate on binary information, some have hexa-decimal digital program inputs. In addition to the input ports provided, they may require auxiliary integrated circuit units connected between the actual data inputs and the computer, all of which is state-of-the-art information. No such auxiliary units are illustrated in FIG. 1 but for clarity of explanation, analogue-digital converters A/D are shown where they would be required and the same applies to digital-analogue converters (D/A). As mentioned, a computer programmer will start with certain equations to be solved, which are described later, and will program the computer to solve them, based on input data, variable and constant.

In the diagram of FIG. 1, physical flow lines are shown as solid lines, whereas control signals, which are usually voltages, are shown in dotted lines in both their analogue and their digital form. The variable quantities continuously entering the microcomputer are shown in dotted lines and certain constants that are set into computer are shown encircled on the block diagram of the computer. The equations of FIGS. 2, 2A, 3, 3A and 4, to be discussed presently will enable a programmer experienced with a given microcomputer to program the computer in order to obtain the desired output computations. The advantage of using the computer is that it makes possible continuous control based on interdependent and complex calculations. If the operator of the system attempted to control the system by first taking various readings of the quantities to be described and then computing the desired output values, the resultant process would be so time consuming that by the time the proper optimum or set quantities were calculated, data upon which they were based could be so obsolete as to render them of minimal assistance.

Flow Diagram

Primary Clarifier

The sewage treatment system of FIG. 1 includes a primary clarifier PC which receives influent sewage from line 10. This sewage will have been screened to exclude large objects but will include setteable inorganic and organic matter known as setteable solids. The primary clarifier, which may include a traveling rake (not shown) in accordance with known constructions, has a sump 12 for receiving the setteable solids. About half of the putrescible organic matter which must be removed by treatment will remain either in solution or in suspension in the liquid in the primary clarifier and does not settle out into the sump 12. The sump 12 is drained by a solids withdrawable line 14 connected to the inlet on a pump P which has an outlet line 16.

Aeration Tank

The system shown in FIG. 1 includes an aeration tank, AT and is what is known as a completely mixed system. The liquid (water) containing organic matter leaves the primary clarifier PC by a line 18 and the flow rate of sewage liquid in this line is referred to in the equations to be described as ($Q_{IN}$). In the form shown, the line 18 continues on as line 20 and line 20 includes not only the liquid from the clarifier but the returned activated sludge, the flow rate of which is referred to as ($Q_{RAS}$). The mixture of sewage liquid and returned activated sludge in line 20 is directed to the aeration tank AT and here the aerobic bacteria or cells, previously described, consume a large percentage of the organic material in the liquid, resulting in an increase in the number of cells (growth) and the respiration of $CO_2$ and water. It is customary in the sewage treatment, art to refer to the solids suspension in the aeration tank as "mixed liquor".

As is well known in the art, in order to keep the solids in an agitated suspension and to supply the oxygen necessary for the metabolic activities of the cells or activated sludge in the aeration tank, in the illustrated embodiment of the invention an air line 22 is provided. In order to control the system of the present invention, the flow rate ($Qa$) of the air in line 22 is measured by an air flow meter, AFM. The air leaves the meter by line 22a and enters a diffuser 24 of known construction so that the air bubbles up through the mixed liquor and keeps substrate particles in suspension as well as supplying the oxygen which is dissolved in the water and is required for the metabolism of the activated sludge.

In the form shown, the aeration tank is provided with a mixed liquor withdrawal well 26 connected to a mixed liquor withdrawal line 28. In the preferred form of control system of the present invention, the rate of flow of mixed liquor leaving the aeration tank, to be referred to as ($Q_{OUT}$), is measured. Although ($Q_{IN}$) could also be measured it is computed by subtracting ($Q_{RAS}$) from ($Q_{OUT}$). Accordingly, the withdrawal line 28 delivers the liquor to a flowmeter QFm which measures ($Q_{OUT}$) and the measured flow leaves the meter by line 28a. As mentioned, the reduction in volume of the air entering the tank caused by solution of oxygen in the water is so minute that it can be ignored in the computations relating to air flow ($Qa$), to be explained presently.

Secondary Clarifier

A secondary clarifier SC receives the mixed liquor from line 28a and clarified effluent is discharged and withdrawn through a line 30 either by overflow or by a discharge pump P1. The secondary clarifier is provided with a sump 32 for collecting settled activated sludge AS. Activated sludge that does not settle out in the secondary clarifier may be withdrawn in the line 30 along with clarified effluent, thereby increasing the organic content of that effluent.

As previously explained, the object of the present invention is to optimize the settling rate of the activated sludge. It is known that in a given system the settling rate is an optimum at a certain food to mass ratio (F/M) which is a constant $(F/M)_{SET}$ for the system. Under the present invention this is accomplished by continuously determining the rate (F) at which food enters the aeration tank. The corresponding mass (M) of activated sludge cells in the tank, required to maintain the aforesaid optimum F/M ratio, is computed in terms of an optimum or set activated sludge density ($X_{SET}$). This computation in turn is used to generate a control signal ($Q_{RAS}$) for a pump (to be described presently) that returns activated sludge to the aeration tank.

Activated Sludge Storage and Return

Continuing with a brief description of the flow diagram of FIG. 1, the settled activated sludge AS in sump 32 is withdrawn through a line 34 by a pump P2 and delivered by a line 36 to a stored activated sludge tank ST. Such a tank is desirable in the system because it assures a constant supply of aerobic activated sludge available for return to the aeration tank independent of temporary variations in the supply of activated sludge in the sump 32 of the secondary clarifier. It also facilitates determination of the density ($X_S$) of the activated sludge, which determination is employed in the computation of the return sludge rate signal ($Q_{RAS}$).

In order to keep the activated sludge AS in the storage tank ST alive (and aerobic), an air supply line 38 is connected to a diffuser 40 which provides the oxygen necessary for the endogenous respiration of the cells.

The rate ($Qas$) of the air flow in the line 38 depends upon the volume of the tank ST and the rate of oxygen supply required to keep the cells alive (and aerobic). Thus, once these factors are determined, the aeration rate ($Qas$) can be held at some constant value. Stored activated sludge is withdrawn from the storage tank through a line 42 and is directed to a solenoid operated, spring return valve 44. In the form illustrated, the valve has two sections 44a, 44b and in the conditions shown in FIG. 1, the solenoid s for the valve is de-energized, so that section 44a is in the line. Under these conditions, the sludge withdrawal line 42 is connected to a line 46, which is the suction line of an activated sludge return pump P3. This pump is driven by a variable speed motor M3, the speed of the motor being controlled by a motor controller MC3, which controller also receives line power through a switch SW. Return activated sludge is delivered by the pump P3 through line 48 which joins the lines 18 - 20, previously described, leading to the aeration tank. The quantity of returned activated sludge ($Q_{RAS}$) delivered by the pump P3 is a flow rate that is controlled by the system of the present invention in order to maintain the computed or set density ($X_{SET}$) of the activated sludge in the mixed liquor in the aeration tank at a value which optimizes the (F/M) ratio, as previously described.

Sludge Wasting

If the solenoid s that operates the valve 44 is energized, the valve Section 44b is placed in the line. Under these conditions, the activated sludge return pump P3 can continue to withdraw activated sludge from the tank ST through the line 46 and a sludge waste line 49 is connected to the inlet of a waste pump P4 which wastes sludge through a line 50 that joins the line 16 from the pump P, previously described, and which contains settleable solids pumped from the primary clarifier. The two lines 50, 16 join to form the waste sludge line 51 which delivers waste to a digester or the like for disposal. The waste pump P4 is driven by a motor M4 which is turned on and off by a motor controller MC4.

Controls and Signals

As previously mentioned, the equations to be solved for continuous control of the system are so complex that a computer is required in order to keep the computed data suitably current for system control. In the embodiment of the invention shown, a microcomputer M is illustrated in a block diagram. The computer is shown as comprising two main sections, an input/output program section or interface IS, which is the interface between the computer and various fixed and variable quantities going to make up the program. The computer also has a computer section, CS which includes a number of registers, a memory, a program counter, a stack pointer, etc., all functions of which are known in the art. As usual, the computer has a built in clock. Variable analogue control signals enter the input program section in digital form and hence analogue-digital converters (A/D) are provided, either in the computer or in associated integrated circuits. Various constants, which are determined in a manner to be explained, are manually set into the program section of the computer. The two important and ultimate quantities calculated by the computer are the optimum or set density ($X_{SET}$) as indicated in parenthesis within the computer section block and the pump control signal ($Q_{RAS}$), and these are found by solving the equations described later in accordance with a program set into the computer. A microcomputer of the type suitable for the present system is the Intel 8080 microprocessor manufactured by the Intel Corporation of Santa Clara, California.

Substrate Consumption Rate

As previously mentioned, in accordance with the principles of the control system of the present invention, the rate of substrate consumption by the activated sludge cells in the mixed liquor is determined. This depends upon the metabolic rate of the cells in the activated sludge in the aeration tank and it has been found that there is good correlation between the $CO_2$ respiration rate of the cells in the mixed liquor and the biochemical oxygen demand rate of the substrate therein. Accordingly, the control of the system is based (in part) on a determination of the percentage of $CO_2$ ($CO_2\%$) contained in gases (principally air and $CO_2$) collected at or near the surface of the mixed liquor in the aeration tank. Thus, a $CO_2$ collector CL1 is provided at the mixed liquor tank, this collector being in the form of a simple inverted funnel. The funnel collects $CO_2$ respired by the cells and air from the diffuser 24 that reaches the collector. The collected gases pass through a condenser 52 which condenses out water vapor and enters through a water trap (not shown) via line 54 into a non-dispersive infra-red analyzer 56. The analyzer 56 measures the percentage of $CO_2$ ($CO_2\%$) in the collected gases and provides the measurement as an analogue voltage (say 0–5 volts) in its output line 58. The percent of $CO_2$ can be displayed on a volt meter M1 having a scale calibrated to read the ($CO_2\%$) measurement. The measurement also is directed to an A/D converter 60 which provides the measurment in digital form to the microcomputer M via input 60a. This, and other A/D converters shown may either be in the computer or in accessory input integrated circuit units connected thereto, in accordance with principles well known in the computer art.

Air Flow

In order to determine the $CO_2$ production rate based upon the measured percent of $CO_2$ just described, it is necessary to known the rate of air flow into the aeration tank, which is measured by the airflow meter AFM. In the present system, this measurement ($Qa$) in liters per hour is provided in analogue form at the output line 62 of the air flow meter and is converted by an A/D converter 64 to a digital signal entering the computer via line 62a.

Mixed Liquor Sludge Density

One of the ultimate computations made by the computer for controlling the activated sludge return rate is the comparison ($X_{SET}$-X) where ($X_{SET}$) is the optimum or set density of the activated sludge in the aeration tank and (X) is measured density. The density (X) is preferably measured by an optical type densitometer 70 immersed in the mixed liquor. A suitable instrument being the Suspended Solids Meter (Model 52L), manufactured by Bishoperics Company of Rockville, Maryland. Density measurement is provided as an analogue voltage (say zero to five volts) in the output line 72 and is converted into digital form by an A/D converter 73 and enters the computer in digital form by input line 72a.

$Q_{OUT}$ Flow Signal

As mentioned, the flow meter Q measures the rate of flow of mixed liquor to the secondary clarifier. This measurement signal is directed by line 74 to an analogue/digital converter 75 which supplies the information in binary form via line 74a to the microcomputer.

Stored Activated Sludge Density

In order to provide the control signal ($Q_{RAS}$) for the return rate of activated sludge pump P3 as well as to provide a warning in case the density ($X_s$) of the stored activated sludge is less than the density (X) of the activated sludge in the mixed liquor, the density ($X_s$) of the stored activated sludge is measured and entered into the computer. The storage tank ST contains all activated sludge and optical type densitometers, such as the Biospheric unit 70, are not satisfactory with materials as dense as the stored sludge. However, since the stored activated sludge in the tank ST is not consuming external substrate but is merely being kept alive (and aerobic), the $CO_2$ produced at the storage tank represents the endogenous $CO_2$, which is produced solely by the respiration of the cells necessary to keep them alive. Accordingly, the percentage of endogenous $CO_2$ in the gases collected by a second collector CL2 is a direct function of the density ($X_s$) of the activated sludge in the storage tank and the known air flow rate ($Qas$) set into the computer. As before, a funnel type collector CL2 collects gases containing endogenous $CO_2$ and air from the diffuser 40, which gases are passed through a condenser 76 and are directed by a line 78 to a non-dispersive infrared analyzer 80, which is preferably like the analyzer 56. The analyzer 80 determines the percentage of $CO_2$ in the collective gases and provides an electrical signal output which is a function of this percentage and the constant aeration rate ($Q_{as}$). This function is in turn proportional to the activated sludge density $X_s$. The aforesaid analogue density signal is presented in the analyzer output line 82, has a voltage of say (0-5 volts) and is displayed on a meter M2, the scale which is calibrated to read activated sludge density. The density signal line 82 enters an A/D converter 84 and is presented in digital form to the computer by line 82a. As will be seen, the stored activated sludge density ($X_s$) is used in the computation of the control signal ($Q_{RAS}$) for the activated sludge return pump.

The return activated sludge signal $Q_{RAS}$ is determined by the microcomputer and is directed in digital form by line 86 to a digital/analogue converter 88, which controls the motor control switch M3 via line 86a.

One of the factors entering into the most complete expression for the pump control signal ($Q_{RAS}$) is the term ($X_S$-X). This represents the difference between the measured density ($X_s$) of the stored activated sludge and the measured density (X) of the activated sludge in the aeration tank. It is evident that if the density ($X_s$) of the stored activated sludge is equal to or less than that (X) of the activated sludge in the aeration tank (an unusual condition), it would be theoretically futile to return such low density activated sludge to the mixed liquor in the aeration tank, because such return would merely dilute the activated sludge in the aeration tank rather than replace sludge withdrawn in line 28 and sent to the secondary clarifier.

The measurement of stored activated sludge density ($X_s$) which enters the computer in line 82a is also presented by a branch line 82b to a comparator C. Similarly a branch line 72b of the measured density line 72a supplies information as to measured sludge density (X) to the comparator C. The output of the comparator in line 90 is the aforesaid difference ($X_S$-X) which difference is presented to an amplifier 92 having an output line 90a representing the difference. Line 90a is connected to a warning device W, such as a warning light, and the amplifier 92 contains an inhibitor circuit so that if the aforesaid density difference is greater than 0, (the usual condition) the warning light W is turned off. As mentioned, if under abnormal conditions the density difference becomes zero or becomes negative, it is theoretically futile to continue operation of the activated sludge return pump P3 beccause this pump would be delivering activated sludge to the mixed liquor which is no more dense or even less dense than the sludge already present therein. Thus, the warning signal indicates to the operator that the motor M3 for the return pump P3 should theoretically be shut off by operating the switch SW.

Overflow Prevention

In normal operation, the rate of return ($Q_{RAS}$) of activated sludge to the aeration tank is less than the rate at which settled activated sludge accumulates in the sump 32 of the secondary clarifier. Thus, in normal operation, the stored activated sludge in the storage tank ST would overflow the tank and accordingly means are provided to automatically waste sludge from the storage tank ST to prevent it from overflowing.

To accomplish the aforesaid purpose, a sludge level monitor 94 is provided for measuring the level of the activated sludge in the tank ST. This can be a conventional float type level monitor which operates a potentiometer and provides an electrical output signal in line 94a when the sludge reaches a certain predetermined maximum level. The aforesaid high level signal is directed to the relay R. This relay has one control line 94b for energizing the solenoid s of the valve 44 and another control line 94c for energizing the motor controller MC4 for the motor M4 of the waste sludge pump P4. When the line 94b presents a signal to the solenoid s of the valve 44, the valve is shifted to bring valve section 44b into the line. This connects both the sludge return pump P3 and the sludge waste pump P4 to the storage tank ST. The signal from line 94c to the motor controller MC4 turns on the pump motor M4 and causes the pump P4 to waste excess activated sludge to the aforesaid delivery line 50 and on to the waste sludge line 51.

Having briefly described the various flow signal and control elements of a typiical system of the present invention as shown in FIG. 1, various theoretical aspects of the control system will now be described.

The development of control equations for the system of the invention is presented in two parts. The equations of Part One in FIGS. 2 and 2A relate to the computation of the optimum density $X_{SET}$ of the activated sludge in the mixed liquor which will result in the optimum food to mass ratio $(F/M)_{SET}$, with the resultant optimum settling rate of activated sludge in the secondary clarifier.

The equations of FIG. 3 represent Part Two of the set of equations and these equations represent the development of the signal $Q_{RAS}$ for controlling the motor M3 of the activated sludge return pump P3. In the description that follows, reference will be made to the numbered equations in the drawings and where necessary, a brief explanation of the meaning of various expressions will be given. In both parts One and Two, the equations are presented in a progressively developed series of equations which terminates in the ultimate equation or set point desired.

Part One

Computing Activated Sludge Density ($X_{SET}$) For Optimum Settling Rate $(F/M)_{SET}$ In the discussion that follows, various numbered expressions and equations are given in FIG. 2, et seq, and to avoid the need for incorporation of the equations into the printed specification, reference will be made to these equations in terms of their assigned numbers shown in the drawings. The definition of various terms in the equations and their units appears in lists at the end of this specification. In the interest of consistency, all units are expressed in terms of milligrams, liters and hours.

The term (1) is a symbol for the unit rate of substrate consumption by the cells of the activated sludge in the aeration tank, in terms of mg of substrate consumed/liter of mixed liquor/hr. It will be recalled that the term "substrate" refers to the organic matter suspended in or in solution with the mixed liquor in the aeration tank.

Expression (2) shows the makeup of the term (F), which is the weight of food entering the aeration tank per hour and which equals the concentration ($S_{IN}$) of the organic matter in the entering sewage times the flow rate ($Q_{in}$) of the sewage.

In Expression (3) the lefthand term is Term (1) multiplied by the volume (V) of the aeration tank and hence this term gives the total milligrams of substrate consumed by the cells per hour as compared to Term (1) which gives the milligrams of substrate consumed by the cells per hous per liter of mixed liquor in the aeration tank. The right hand term of Expression (3) merely indicates the necessary equilibrium or mass balance in flow rates by showing that the rate at which food (F) enters the aeration tank minus the rate at which substrate is withdrawn from the tank for delivery to the secondary clarifier must equal the total rate at which substrate is consumed by the cells of activated sludge in the tank.

Expression (4) is a rearrangement of Expression (3) to express the term (F) in equilibrium or mass balance conditions.

Expression (5) shows that the term (M) in the food to mass ratio (F/M) term in the lefthand side of the equation merely represents measured cell density (X) times the volume (Va) of the aeration tank. It is to be noted that at any given instant, the amount of food (F) entering the aeration tank is independent of the mass (M) of activated sludge suspended in the mixed liquor of the tank.

As will be recalled, the control objective in the system of the present invention, is to optimize the settling rate of the activated sludge in the secondary clarifier and that this settling rate is optimum at a certain food to mass ratio referred to as (F/M)$_{SET}$.

This optimum ratio is a constant known for sewage systems in general, and is set into the computer as a constant. In the present example, (F/M)$_{SET}$ equals about 0.30/24. The control system cannot control the rate of food (F) entering the aeration tank, but it can compute an optimum sludge density in the tank ($X_{SET}$), the computation of which culminates the series of equations in Part One.

Expression (6) represents the solution of Expression (5) in terms of sludge density (X) except that the density term (X) in Expression (6) is replaced by the optimum density ($X_{SET}$). The optimum food mass ratio (F/M)$_{SET}$ is substituted for the term (F/M) of Expression (5). The remainder of the equations of Part One indicate the principles of calculating ($X_{SET}$) as expressed in Expression (6).

In computing ($X_{SET}$) a determination of the rate of change of sludge or cell density in the aeration tank can be explained in terms of a theory which includes two modes for expressing the rate of change of cell density due to cell growth.

Expression (7) expresses cell density change rate due to cell growth in terms of cell growth rate/cell ($\mu$) and measured cell density (X) and can be characterized as expressing growth rate biologically.

Expression (8) is another term for cell density change rate due to cell growth. Here the rate is expressed in terms of rate of substrate consumption by the cells and the yield factor (Y) of the cells in the system being investigated.

Expression (9) is obtained by equating Expressions (7) and (8) and solving for the unit substrate consumption rate, namely, the mg of substrate consumed by the cells per hr./liter of mixed liquor.

Expression (10) is a statement of the well known Monod model for the general determination of cell growth rate in terms of maximum growth rate and substrate concentration. This expression appears in a paper entitled "The Growth of Bacterial Cultures" by Jacques Monod printed in the Annual Review of Microbiology, Volume III, Pages 371–394 (1939). Expression (10) is developed on Page 383 of the aforesaid paper and is a generalized expression for the growth of bacteria cultures, which expression can be utilized in the studies of the growth rate of the cells of activated sludge in sewage treatment systems.

Expression (11) is an equation for the unit rate of substrate consumption by the cells obtained by substituting the righthand term of the Monod equation (10) for the term ($\mu$) in Expression (9). Referring back to Expression (10) it is to be noted that in a completely mixed system, when employing the Monod equation the concentration (S) in the tank is equal to the strength or concentration ($S_{OUT}$) of the substrate in the mixed liquor withdrawn from the tank and delivered to the secondary clarifier. Hence, the term ($S_{OUT}$) replaces the term (S) in arriving at Expression (11).

Expression (12) represents a rearrangement of Expression (11) in order to express the strength ($S_{OUT}$) of the substrate in the mixed liquor leaving the aeration tank.

Expression (13) is an expression for the rate (F) of food entering the aeration tank obtained by substituting the righthand term of Expression (12) for the term for the ($S_{OUT}$), the strength of the mixed liquor leaving the aeration tank found in Expression (4).

Expression (14) is a rearrangement of Expression (13) to present the equation for (F) in a simpler form.

Expression (15) is an equation expressing the unit substrate consumption rate in terms of the ($CO_2$) respiration rate of the cells (activated sludge) in the aeration tank. Referring to the right side of equation (15), the expression within the parenthesis can be explained as follows:

The first term is the $CO_2$ production rate per liter of mixed liquor in the tank. This term represents the total $CO_2$ production rate produced by respiration of the cells in the activated sludge in the aeration tank, which includes $CO_2$ produced both from substrate consumption by the cells and by endogenous cell respiration. The second term (EX) represents the endogenous respiration rate of the cells per liter of mixed liquor (aeration tank volume) and is hence subtracted from the total respiration rate to obtain the respiration rate due to substrate consumption. The term (E) is a coefficient of endogenous respiration and is a constant, depending upon the nature of the particular bacteria under investigation, namely those in the mixed liquor. The coefficient (E) is predetermined in the laboratory in a manner to be briefly mentioned presently. The coefficient (E) represents the rate of endogenous ($CO_2$) production in liters per milligram of cells in the aeration tank and therefore when it is multiplied by the measured cell density (X) in the tank, the expression (EX) represents the liters of endogenous $CO_2$ produced per hour/liter of mixed liquor in the aeration tank (tank volume).

Expression (16) equates the $CO_2$ production rate to the measured percentage of $CO_2$ determined by analyzer 56, ($CO_2$%) multiplied by the term ($Qa'$), the unit air flow rate. Both sides of Expression (16) represents the total liters of $CO_2$ produced per hour in the aeration tank/liter of mixed liquor in the tank.

Expression (17) expresses the rate (F) of food entering the aeration tank in terms involving measurements such as ($CO_2$%), the unit air flow rate ($Qa'$) of air to the aeration tank, the density (X) of the activated sludge in the tank, the known volume (V) of the aeration tank, and the flow rate ($Q_{OUT}$) of mixed liquor leaving the aeration tank. Expression (17) also contains certain biological terms such as the yield factor (Y), a constant (A) that relates substrate consumption to ($CO_2$) production, the constant ($\mu$) the maximum growth rate of the cells, and the Monod constant ($K_S$) the concentration of the substrate at maximum growth rate. These constants are also predetermined by laboratory tests for a given system, as will be explained.

Expression (17a) gives the formulae for the optimum density ($X_{SET}$) of the activated sludge in the aeration tank which will provide the maximum settling rate of the cells of the activated sludge in the secondary clarifier for an optimum valve ($F/M_{SET}$) set into the computer.

The Expression (17a) for ($X_{SET}$) is obtained by substituting the right term of equation (17) for the term (F) in equation (6). The measurements and various constants referred to in connection with Expression (17) also are found in Expression (17a). One of the internal computations made by the microcomputer is the computation of ($X_{SET}$) as shown in Expression (17a) and this is indicated in parenthesis in the block diagram of the computer section in FIG. 1.

It is noted that in Expressions (17) and (17a) for ($X_{SET}$) the measured activated sludge density (X) appears in the right side of the equation. This may appear to represent a mathematically incomplete expression for ($X_{SET}$) but practically, the expression is complete. The denisty term (X) appearing in the aforesaid expressions represents current measurements of actual density in the aeration tank, which measurements are continuously introduced into the computer and hence can be employed in the determination of ($X_{SET}$) by the computer.

Part Two

Computing the Ideal Rate of Flow ($Q_{RAS}$) of Return Activated Sludge

The series of equations in Part One, just discussed, concludes by demonstrating how the optimum activated sludge density ($X_{SET}$) can be computed, in order to obtain the optimum settling rate of the activated sludge in the secondary clarifier. The series of equations of Part Two, which will now be briefly described, show the development of the computation for the quantity ($Q_{RAS}$) which is the ultimate determination of the system and which represents the rate of activated sludge return to the aeration tank which will maintain the actual density (X) of the activated sludge in that tank at the aforesaid optimum valve ($X_{SET}$).

Expression (18) of Part Two shows the quantities involved in determination of the rate of change of activated sludge density. The first term on the right side of equation (18) includes the density ($X_S$) of the return activated sludge, the activated sludge rate ($Q_{RAS}$) to be determined and the volume (V) of the aeration tank. In the present example, the units of this and the other terms will be milligrams of activated sludge per liter/hr. The second term in Expression (18) represents the overflow loss rate of sludge due to withdrawal of mixed liquor from the aeration tank for entry into the secondary clarifier. This is obviously a negative term. The third term is an expression for cell growth rate in terms of the yield factor (Y), previously defined, and the rate of substrate consumption by the cells. This is obviously a positive term. The only controllable term in the Expression (18) is ($Q_{RAS}$) and it is the purpose of the control system to determine this quantity and bring the rate of change of cell density (X) in the aeration tank to zero.

Expression (15) is an equation which represents the rate of substrate consumption by the cells based on cell respiration, which has been previously referred to in Part One.

Expression (19) is simplification of the righthand term of Expression (15) which is presented as A ($\Delta$), to be utilized merely as a form of shorthand in the series of equations that follows.

Expression (20) is also an expression for the rate of change of cell density (X) in the aeratin tank and is obtained by substituting Expression (19) for the rate of substrate consumption into the final term of Expression (18) and rearranging the terms.

In accordance with control principles of the present invention, until the activated sludge density (X) in the aeration tank is at its optimum value ($X_{SET}$), the rate of change of actual sludge density in the aeration tank should be a function of the density difference or error. Expression (21) shows that the density difference or error ($X_{SET}-X$) is multiplied by a control constant ($\beta$) and this function, which is determined by the computer, is a portion of the control signal for determining ($Q_{RAS}$) and is the principal control portion of that signal.

Expression (22) for the error signal itself, is obtained by equating Expressions (20) and (21).

Expression (23) is obtained by solving Expression (22) for the ultimate control signal ($Q_{RAS}$).

Expression (24) is a rearrangement of Expression (23) wherein the right side of the Expression is arranged so that it meaningfully presents the three quantities going to make up the ultimate determination of ($Q_{RAS}$), namely the return rate of activated sludge to the aeration tank.

The right side of Expression (24) contains three individual terms. The first term is the one that can be controlled by the system and it corrects for the difference between optimum or sludge density ($X_{SET}$) and the measured sludge density (X) in the aeration tank. This term is also a function of the density ($X_s$) of the returned activated sludge, the volume (V) of the aeration tank and the control constant ($\beta$). The next two terms of Expression (24), taken together, express the steady state sludge return rate. Referring back to the diagram of FIG. 1, the pump P3, which returns activated sludge to the aeration tank at the rate ($Q_{RAS}$), must make up for the activated sludge which is withdrawn along with the mixed liquor in line 28, (loss to clarifier) minus the growth of cells due to the substrate consumption. Thus, the steady state return sludge rate shown in Expression (24) contains a positive term which represents the loss of activated sludge to the clarifier and a negative term which relates to the growth of cells due to substrate consumption. The net steady state sludge return rate signals added to the density difference rate signal (the first term) of Expression (24) make up the return rate signal ($Q_{RAS}$) for controlling the activated sludge return pump P3 of FIG. 1.

Expression (24) just described has a term representating loss of activated sludge to the clarifier which includes the flow rate to the clarifier ($Q_{OUT}$). The significance of the three terms in Expression (24) are, in a sense, more meaningful if the Expression is rewritten with the flow rate of incoming sludge ($Q_{in}$) substituted for ($Q_{out}$) in Expression (24), but in the system being described the quantity ($Q_{IN}$) is not directly measured.

Expression (25) shows how ($Q_{IN}$) can be obtained by the measurement of ($Q_{OUT}$) (See FIG. 1) and knowing the return sludge rate ($Q_{RAS}$). It is noted that the quantity ($Q_{IN}$) is independent of the quantity ($Q_{RAS}$) and hence the computer can determine ($Q_{IN}$) by a regenerator comparison of ($Q_{OUT}$) and ($Q_{RAS}$), as shown in Expression (25).

Expression (26) is like Expression (24) with the quantity ($Q_{IN}$) substituted for the quantity ($Q_{OUT}$) in Expression (24). The three terms in the right side of Expression (26) are functionally the same as those described in connection with Expression (24) but it is noted that in Expression 26, the denominator of these terms contain the quantity ($X_S - X$) instead of $X_s$. The new denominators represent the difference between the density ($X_s$) of the returned activated sludge and the measured density ($X$) of the activated sludge in the aeration tank. The aforesaid difference is internally computed by the computer. Consideration of Expression (26) will show that if the measured sludge density ($X_s$), which is normally greater than the measured sludge density ($X$), drops to a value wherein it is equal to or less than the measured sludge density ($X$), the denominators in equation (26) all become zero, indicating mathematically that which is obvious, namely that under these conditions, the rate of return activated sludge ($Q_{RAS}$) would have to be infinite and even so, the system is hence out of control. As was previously explained, in connection with the diagram of FIG. 1, the warning device W provides a warning signal when the aforesaid difference ($X_S - X$) becomes zero or less, indicating that the control of the system has been lost and that it would be futile to operate the return sludge pump P3.

Part Three

Simplified Computation of ($X_{SET}$)

FIG. 4 shows a series of equations for the computation of ($X_{SET}$) based on two simplifying assumptions. Experiments conducted at the Municipal Sewage Plant at San Jose, California show that the utilization of the approximations employed in the equations of Part Three provide good correlation with the more complete and rigorous measurements in Part One, and hence could be employed for controlling the system of the present invention.

The first equation of Part Three is Expression (15), which was previously described as giving the rate of substrate consumption in terms of the total production rate of $CO_2$ by the cells in the aeration tank minus the endogenous rate (EX) of $CO_2$ production. In practice, the total rate of $CO_2$ production is much greater than the endogenous rate (EX), it being recalled that the endogenous rate is the rate of $CO_2$ produced solely by respiration of the cells in order to keep them in an aerobic state as opposed to the rate of $CO_2$ produced by the cells due to their growth by the consumption or oxidation of substrate.

Expression (28) represents the first simplifying assumption, namely, that of ignoring the term (EX) in Expression (15). Thus (28) gives the substrate consumption rate solely in terms of the total $CO_2$ respiration rate of the cells and the constant (A) previously mentioned, and as mentioned the term (EX) is relatively so small that it can be ignored.

Expression (29) presents the rate of substrate consumption in terms of a mass balance, namely in terms of the food entering the aeration tank ($S_{IN}Q_{IN}$) minus the substrate withdrawn from the aeration tank and delivered to the final clarifier ($S_{OUT}Q_{OUT}$) divided by the volume (V) of the mixed liquor in the aeration tank (which is a constant since the tank is always full).

In a properly controlled and operated treatment system, consumption of substrate by the activated sludge in the mixed liquor of the aeration tank is so efficient that the concentration ($S_{OUT}$) of organic matter in the mixed liquor leaving the tank and entering the final clarifier is very small, namely less than 30 ppm compared to about 300 ppm for $S_{IN}$. The second simplifying assumption is that of assuming that ($S_{OUT}$) is zero, whereby the term ($S_{OUT}Q_{OUT}$) in Expression (29) can be ignored and omitted from further calculations.

Expression (30) represents the rate of substrate consumption as shown in Expression (29) with the assumption that the concentration ($S_{OUT}$) is zero.

Expression (31) is obtained by equating Expression (28) with (30) and solving for the quantity ($S_{IN}Q_{IN}$). Expression (31) shows that the aforesaid quantity is equal to the $CO_2$ production rate of the cells in the aeration tank multiplied by the constant (A) and the volume (V) of the tank which equals the volume of mixed liquor in the tank.

Expression (16) was presented in connection with Part One and merely expresses the fact that the $CO_2$ production rate is equal to the ($CO_2\%$) measured at the aeration tank multiplied by the unit air flow rate ($Qa'$).

Expression (32) is obtained by substituting the right term of Expression (16) into Expression (31). Expression (32) also is given in terms of food (F) which is equal to ($S_{IN}Q_{IN}$).

Expression (33) shows how the control signal ($X_{SET}$) can be obtained from the preceding equations. This expression for ($X_{SET}$) is obtained by substituting the right term of Expression (32) for the term (F) in equation (6) of Part One. Expression (33) shows that ($X_{SET}$) can be computed by supplying the computer with the constant (A), the quantity ($Qa'$) which is the unit rate of aeration airflow, is based on a measured quantity ($Qa$) shown in FIG. 1 and which equals ($Qa/V$). The term ($CO_2\%$) in Expression (33) is measured by the collector (CL 1) and the analyzer 56 (FIG. 1) as previously described. The term ($F/M_{SET}$) is a constant for optimum settling rate of the activated sludge which has been predetermined and set into the computer as a constant, as indicated in FIG. 1.

When the computer determines the density ($X_{SET}$) in accordance with the Expression (33) of Part Three, determination of the control signal ($Q_{RAS}$) for the return activated sludge pump P3 will follow the principles previously described in connection with the equations in Part Two.

Determining Biological Constants

In the previous discussion of the series of the control equations for the system of the present invention, certain biological constants have been referred to. These constants are predetermined by various known laboratory techniques and are set into the microcomputer as indicated in the diagram of FIG. 1. The constants referred to are E, Y, $A\mu$, $K_S$ and $\beta$.

The term (E) represents a coefficient of endogenous respiration of the cells in the activated sludge and since it changes very little with time it can be considered to be a constant. The coefficient (E) can be determined by measuring the amount of $CO_2$ coming off from the activated sludge storage tank ST in a given period of time. That quantity is then divided by the density of the cells in the tank (also measured) and knowing the volume of the tank, the total weight of cells can be determined. This weight is divided into the production rate of endogenous $CO_2$ produced in the tank to produce the coefficient E, which in the example shown in the list of definitions of quantities has the dimensions of liters/mg.hr. By way of an example, in a typical system, the coefficient E will be (0.000989). The value of E is given in the aforesaid definition of quantities and typical examples of the other constants are also given in parenthesis following the symbol for the quantity.

The yield factor (Y) represents the weight of cells produced per weight of substrate consumed. This factor is obtained by measuring the density of the solids in the aeration tank over a period of time and by measuring the rate at which food is being fed into the tank. The factor is dimensionless and in a typical example will be (0.53).

The constant (A) is a constant which relates to the amount of $CO_2$ produced by the cells for each milligram of substrate consumed. This constant is obtained by measuring $CO_2$ production and comparing it to the substrate removal rate from the tank. The substrate removal rate is measured in a laboratory test by determining the rate of food coming into a test vessel, such as an aeration tank, subtracting the rate of food leaving the vessel, which difference represents rate at which substrate is consumed in the tank. These measurements are made over a given period of time and the constant (A) is obtained (for example) by dividing the milligrams of substrate which the cells have consumed by the volume in liters of $CO_2$ produced during such consumption. In the typical example being given, the constant (A) equals 9.61 mg/liter.

Two more biological constants must be predetermined and set into the system. These are terms of the Monod equation of Expression (10), namely $(\mu_m)$ and $(K_S)$. In order to determine these two constants, the rate at which substrate is removed as a function of substrate concentration in the aeration tank is measured and this measurement is made at different values of substrate concentration. From these measurements a curve is plotted. The constants $(\mu_m)$ and $(K_S)$ are selected which will cause the curve representing the aforesaid measurements to fit the curve representing the Monod formulation. When this curve fitting process has been completed, the two constants $(\mu_m)$ and $(K_S)$ are determined.

The term $(\beta)$ employed as a control term for the control constant in Expressions (24) and (26) for $(Q_{RAS})$ is determined by the system response time (response time = $1/\beta$) requirements. Generally a response time of $\frac{1}{4}$ hr. is adquate for most treatment plants, thus $\beta=4$/hr. Note that the pump P3 will have to be of sufficient capacity to supply return activated sludge at the maximum expected rate calculated by equation (26).

In the Definitions of Quantities that follow, those quantities which are constants to be empirically determined, as explained above, have typical values given thereafter in parenthesis by way of examples.

In the appended claims, reference is made to "continuously" performing certain steps necessary to practice the invention under actual service conditions. The term "continuously" is employed to distinguish over a mode of operation wherein data are recorded and examined by individuals, the data are entered into the complex control equations required, the equations are solved by mental steps and the solutions are employed for necessarily intermittent manual control of the process. This mental step mode of control would be so time consuming that an individual could not provide the necessary process controls except at time intervals so widely spaced that the very improvement represented by the invention would be lost and the operator would be faced with the same conditions faced by prior art operators — the inability to handle relatively rapid changes in loading, etc.

Even if a large group of human calculators were set to work, since the results of each step depend upon those of a previous step, and since the ultimate result must be employed as a control by still another operator, the resultant operation would not only be excessively costly but would still not be functionally "continuous".

However, the term "continuously" is not to be interpreted as being a 100% mathematically continuous operation. For example, a typical microprocessor, such as that referred to, can only provide control signals at time intervals of milliseconds, but in the environment involved this represents a "continuous" operation. Furthermore, for example, the statistical residence time of a particle in the aeration tank is in the order of six hours. Thus (for example) the microprocessor could be programmed to take samples, make the complex calculations required and provide control signals at larger time intervals, such as every 15 minutes, but even such a mode of operation would be considered to be "continuous" by those skilled in the art in comparison to the times allowed for corrective actions and in comparison with the relatively large time intervals now required, which provide control data that are unacceptably discontinuous.

The system of the present invention can be programmed so that fluctuations in loading, etc. will not unbalance the system rapidly enough or to a sufficient extent that control of the system is lost for any significant period of time and in this respect the control is "continuous" from a practical and realistic operational standpoint.

Although the best mode contemplated for carrying out the present invention has been herein shown and described, it will be apparent that modification and variation may be made without departing from what is regarded to be the subject matter of the invention as defined in the appended claims.

| DEFINITION OF QUANTITIES Part One ($X_{SET}$) | | |
|---|---|---|
| SYMBOL | UNITS | MEANING |
| $Q_{IN}$ | l/hr | $\frac{\text{Flow of influent sewage in liters}}{\text{hr}}$ |
| $S_{IN}$ | mg/l | $\frac{\text{mg food in influent sewage}}{\text{liter influent sewage}}$ (strength or concentration of sewage) |
| $F=S_{IN}Q_{IN}$ | mg/hr | $\frac{\text{mg food entering tank}}{\text{hr}}$ (food) |
| X | mg/l | $\frac{\text{mg of cells actually in tank}}{\text{liter of mixed liquor in tank}}$ = measured cell density |
| $X_{SET}$ | mg/l | optimum or set cell density (computed) |

-continued

DEFINITION OF QUANTITIES
Part One ($X_{SET}$)

| SYMBOL | UNITS | MEANING |
|---|---|---|
| V | l | Volume of aeration tank in liters (liters of mixed liquor) |
| M = XV | mg | mg of cells actually in tank (Mass) |
| F/M | 1/hr | $\frac{\text{mg food entering tank/hr}}{\text{mg cells in tank}}$ (Optimum value ($F/M_{SET}$) set in as a constant |
| $S_{OUT}$ | mg/l | $\frac{\text{mg substrate remaining in effluent mixed liquor}}{\text{liter effluent mixed liquor}}$ (strength) |
| $Q_{OUT}$ | 1/hr | $\frac{\text{Withdrawal rate of mixed liquor in liters}}{\text{hr}}$ |
| $\frac{dx}{dt}$ (growth) | mg/l hr | $\frac{\text{cells produced by growth in mg per hr}}{\text{liter of mixed liquor in tank}}$ (rate of cell density change due to growth) |
| S | mg/l | $\frac{\text{mg substrate in tank}}{\text{liter mixed liquor in tank}}$ (substrate concentration) |
| $\left(\frac{dS}{dt}\right)_u$ | mg/l hr | $\frac{\text{mg substrate consumed by cells per hr.}}{\text{liter mixed liquor in tank}}$ (substrate consumption rate) |
| $\frac{d(CO_2)}{dt}$ | 1/hr | $\frac{\text{total liters } CO_2 \text{ produced per hr. in tank}}{\text{liters of mixed liquor (tank volume)}}$ ($CO_2$ production rate) |
| ($CO_2\%$) | — | $\frac{\text{liters of } CO_2 \text{ produced per hr. in tank}}{\text{liters of air flow per hr.}}$ |
| Qa | 1/hr | liters of air flow to aeration tank per hr. (measured) |
| $Qa' = \frac{Qa}{V}$ | 1/hr | $\frac{\text{liters of air flow per hr.}}{\text{volume of tank in liters}}$ (unit air flow rate) |
| ($CO_2\%$) $Q_{a'}$ | 1/hr | $\frac{\text{total liters of } CO_2 \text{ produced per hr in tank}}{\text{liters of mixed liquor in tank}}$ = $\frac{d(CO_2)}{dt}$ |
| Qas | 1/hr | liters of air flow to activated sludge tank pr hr. (a predetermined constant) |
| E(.000989) | 1/mg hr | $\frac{\text{liters of endogenous } CO_2 \text{ produced per hr in tank}}{\text{mg of cells in tank}}$ |
| EX | 1/hr | $\frac{\text{liters of endogenous } CO_2 \text{ produced per hr in tank}}{\text{liters of mixed liquor (tank volume)}}$ |
| Y(0.53) | — | $\frac{\text{mg of cells produced}}{\text{mg of substrate consumed}}$ (yield factor) |
| A(9.61) | mg/l | $\frac{\text{mg of substrate consumed by cells}}{\text{Volume of } CO_2 \text{ produced, liters}}$ |
| $\mu$ | 1/hr | $\frac{\text{cell growth in mg per hr.}}{\text{total mg of cells in tank}}$ (cell growth rate) |
| $\mu_m$ (0.324) | 1/hr | $\frac{\text{max cell growth in mg per hr}}{\text{total mg of cells in tank}}$ (max growth rate, a constant) |
| $K_S$ (350) | mg/l | concentration of substrate at $\frac{1}{2}$ max growth rate |

Part Two ($Q_{RAS}$)

| SYMBOL | UNITS | MEANING |
|---|---|---|
| $\frac{dx}{dt}$ | mg/l hr | rate of change of measured cell density (should be zero) |
| $Q_{RAS}$ | 1/hr | liters of activated sludge returned/hr. (ultimate determination) |
| Xs | mg/l | $\frac{\text{mg of stored activated sludge}}{\text{liter of sludge}}$ (returned sludge density) |
| XQ | mg/hr | flow rate of activated sludge in mg/hr |
| $\frac{XQ}{Va}$ | mg/l hr | $\frac{\text{flow rate of activated sludge flow in mg/hr}}{\text{per liter of liquid in tank}}$ |
| $y\frac{dSu}{dt}$ | | $\frac{\text{mg of sludge produced by substrate consumption}}{\text{liter hr.}}$ |
| $\beta$ | 1/hr | arbitrarily selected pump control constant |

What is claimed is:

1. The method of maintaining the optimum settling rate of activated sludge in the secondary clarifier of an activated sludge sewage treatment process; said process being of the type wherein sewage influent is fed to an aeration tank for consumption by bacteria under aerobic conditions, said aeration tank containing a mixed liquor comprising water, organic substrate and a mass of suspended activated sludge and wherein metabolic oxygen for the activated sludge cells is supplied to the mixed liquor, liquor is continuously withdrawn from the aeration tank and fed to the secondary clarifier wherein the activated sludge is permitted to settle out leaving a clarified effluent and a portion of the settled activated sludge is returned to the aeration tank; the improvement comprising the steps of continuously measuring the actual density of the mass of activated sludge in the aeration tank; continuously measuring the volume of $CO_2$ generated by the activated sludge cells and thereby calculating the metabolic rate of the mass of activated sludge in the tank; continuously determining the rate of substrate consumption in the tank based on said metabolic rate measurement; continuously determining the rate at which a given weight of organic matter in the sewage enters the tank, said latter rate to be termed food; selecting the food to mass ratio, based on said substrate consumption rate, which provides the optimum activated sludge settling rate at the final clarifier; continuously determining an optimum set density of the mass of activated sludge in the tank based upon the aforesaid selected food to mass ratio; continuously comparing the measured activated sludge density with the optimum set activated sludge density to determine the difference between the set and measured densities; and regulating the amount of the portion of activated sludge that is returned to the tank in response to the aforesaid density difference to thereby bring said density difference to zero.

2. The method of maintaining the optimum settling rate of activated sludge in the secondary clarifier of an activated sludge sewage treatment process; said process being of the type wherein sewage influent is fed to an aeration tank for consumption by bacteria under aerobic conditions, said aeration tank containing a mixed liquor water, organic substrate and comprising a mass of suspended activated sludge and wherein metabolic oxygen for the activated sludge cells is supplied to the mixed liquor, said activated sludge consuming organic substrate in the mixed liquor with a resultant respiration of $CO_2$, mixed liquor being continuously withdrawn from the aeration tank and fed to the secondary clarifier wherein the activated sludge is permitted to settle out leaving a clarified effluent and a portion of the settled activated sludge is returned to the aeration tank; the improvement comprising the steps of continuously measuring the actual density of the mass of activated sludge in the aeration tank; continuously determining the volume of $CO_2$ respired by the cells on the activated sludge during a given period of time per unit volume of mixed liquor as an index of the substrate consumption rate of the mass of activated sludge in the tank; continuously determining the rate of food entering the tank based on said $CO_2$ volume determination; selecting the food to mass ratio which provides the optimum activated sludge settling rate at the final clarifier; continuously determining an optimum set density of the mass of activated sludge to the tank based upon the aforesaid determination of the rate of food entering the tank and the aforesaid selected food to mass ratio; continuously comparing the measured activated sludge density with the optimum set activated sludge density; to determine the difference between the set and the measured densities regulating the amount of the portion of activated sludge that is returned to the tank in response to the aforesaid density difference to thereby bring the said density difference to zero.

3. The method of claim 2, comprising the steps of storing the activated sludge withdrawn from said secondary clarifier in an intermediate vessel from which said portion of the activated sludge is returned to the aeration tank, aerating said stored sludge to keep the cells therein aerobic, measuring the volume of $CO_2$ respired by the cells in the stored activated sludge during a given period of time per unit volume of the stored sludge, converting said volume measurement into a signal representing the density of the stored sludge, comparing the stored activated sludge density with the measured density of the mass of activated sludge in the aeration tank and providing a signal if said comparison indicates that the stored sludge density does not exceed the sludge density in the aeration tank.

4. The method of maintaining the optimum settling rate of activated sludge in the secondary clarifier of an activated sludge sewage treatment process; said process being of the type wherein sewage influent is fed to an aeration tank for consumption of bacteria under aerobic conditions, said aeration tank containing a mixed liquor water, organic substrate and comprising a mass of suspended activated sludge and wherein metabolic oxygen for the activated sludge cells is supplied to the mixed liquor, said activated sludge consuming organic substrate in the mixed liquor with a resultant respiration of $CO_2$, mixed liquor being continuously withdrawn from the aeration tank and fed to the secondary clarifier wherein the activated sludge is permitted to settle out leaving a clarified effluent and a portion of the settled activated sludge is returned to the aeration tank; the improvement comprising the steps of continuously measuring the actual density of the mass of activated sludge in the aeration tank; continuously collecting the gases leaving a predetermined area of the surface of said mixed liquor; continuously measuring the percentage of $CO_2$ in said collected gases; continuously determining the volume of $CO_2$ collected during a given period of time as an index of the metabolic rate of the mass of activated sludge in the tank; continuously determining the rate of food entering the tank based on said $CO_2$ volume determination; selecting the food to mass ratio which provides the optimum activated sludge settling rate at the final clarifier; continuously determining an optimum set density of the mass of activated sludge in the tank based upon the aforesaid determination of the rate of food entering the tank and the aforesaid selected food to mass ratio; continuously comparing the measured activated sludge density with the optimum set activated sludge density to determine the difference between the set and measured densities and regulating the amount of the portion of activated sludge that is returned to the tank in response to the aforesaid density difference to thereby bring said density difference to zero.

5. The method of maintaining the optimum settling rate of the activated sludge in the secondary clarifier of an activated sludge sewage treatment process; said process being of the type wherein sewage influent is fed to an aeration tank for consumption by bacteria under aerobic conditions, said aeration tank containing a mixed liquor water, organic substrate and comprising a mass of suspended activated sludge and wherein metabolic oxygen for the activated sludge cells in supplied to the mixed liquor, said activated sludge consuming organic substrate in the mixed liquor with a resultant respiration of $CO_2$, mixed liquor being continuously withdrawn from the aeration tank and fed to the secondary clarifier wherein the activated sludge is permitted to settle out leaving a clarified effluent and a portion of the settled activated sludge is returned to the aeration tank; the improvement comprising the steps of continuously measuring the actual density of the mass of activated sludge in the aeration tank; continuously collecting the gases leaving a predetermined area of the surface of said mixed liquor, continuously measuring the percentage of $CO_2$ in said collected gases, continuously determining the volume of $CO_2$ collected during a given period of time as an index of the metabolic rate of the mass of activated sludge in the tank; continuously determining the rate of substrate consumption in the tank based on said $CO_2$ volume determination; continuously determining the rate at which a given weight of sewage enters the tank based on said substrate consumption rate, said rate to be termed food, selecting the food to mass ratio which provides the optimum activated sludge settling rate at the final clarifier, continuously determining an optimum set density of the mass of activated sludge in the tank based upon the aforesaid determination of the food entering the tank, the substrate consumption rate and the aforesaid selected food to mass ratio; continuously comparing the measured activated sludge density with the optimum set activated sludge density to determine the difference between the set and the measured densities, and regulating the amount of the portion of activated sludge that is returned to the tank in response to the aforesaid density difference to thereby bring the said density difference to zerio.

6. The method of maintaining the optimum settling rate of the activated sludge in the secondary clarifier of an activated sludge sewage treatment process; said process being of the type wherein sewage influent is fed to an aeration tank for consumption by bacteria under aerobic conditions, said aeration tank containing a mixed liquor water, organic substrate and comprising a mass of suspended activated sludge and wherein metabolic oxygen for the activated sludge cells is supplied to the mixed liquor, said activated sludge consuming organic substrate in the mixed liquor with a resultant respiration of $CO_2$, mixed liquor being continuously withdrawn from the aeration tank and fed to the secondary clarifier wherein the activated sludge is permitted to settle out leaving a clarified effluent, settled activated sludge is delivered to an aerated storage tank, and settled activated sludge is returned to the aeration tank from the sludge storage tank; the improvement comprising the steps of continuously measuring the actual density of the mass of the activated sludge in the aeration tank and of the sludge in the sludge storage tank; continuously comparing said densities and providing a signal when the density of the activated sludge in the storage tank does not exceed that of the activated sludge in the aeration tank.

* * * * *

UNITED STATES PATENT AND TRADEMARK OFFICE
CERTIFICATE OF CORRECTION

PATENT NO. : 4,130,481
DATED : DECEMBER 19, 1978
INVENTOR(S) : LEE M. CHASE ET AL

It is certified that error appears in the above—identified patent and that said Letters Patent is hereby corrected as shown below:

Column 6, line 33: change "slude" to --sludge--.
Column 24, line 58: change "1" to --l--;
           line 60: change "1" to --l--;
           line 65: change "1" to --l--;
           line 68: change "1" to --l--.
Column 25, line 5: change "1" to --l--;
           line 9: change "1" to --l--;
           line 14: change "1" to --l--;
           line 17: change "1" to --l--;
           line 19: change "1" to --l--;
           line 23: change "1" to --l--;
           line 25: change "1" to --l--;
           line 26: change "1" to --l--;
           line 31: change "1" to --l--;

UNITED STATES PATENT AND TRADEMARK OFFICE
CERTIFICATE OF CORRECTION

PATENT NO. : 4,130,481

DATED : DECEMBER 19, 1978

INVENTOR(S) : LEE M. CHASE ET AL

It is certified that error appears in the above—identified patent and that said Letters Patent is hereby corrected as shown below:

```
Column 25, line 36:  change "1" to --1--;
           line 38:  change "1" to --1--;
           line 42:  change "1" to --1--;
           line 45:  change "1" to --1--;
           line 48:  change "1" to --1--;
           line 53:  change "1" to --1--;
           line 57:  change "1" to --1--;
           line 59:  change "1" to --1--;
           line 62:  change "1" to --1--;
           line 65:  change "1" to --1--.
Column 26, line  5:  change "1" to --1--;
           line  7:  change "1" to --1--;
           line  9:  change "1" to --1--;
           line 12:  change "1" to --1--;
           line 16:  change "1" to --1--.
Column 28, line 56:  change "zerio" to --zero--.
```

Signed and Sealed this

Sixth Day of October 1981

[SEAL]

Attest:

GERALD J. MOSSINGHOFF

Attesting Officer

Commissioner of Patents and Trademarks